(12) United States Patent
Lee et al.

(10) Patent No.: US 11,658,506 B2
(45) Date of Patent: May 23, 2023

(54) HYBRID VEHICLE AND CONTROL METHOD THEREOF

(71) Applicants: Hyundai Motor Company, Seoul (KR); Kia Motors Corporation, Seoul (KR)

(72) Inventors: Chun Hyuk Lee, Gyeonggi-do (KR); Seong Ik Park, Seoul (KR); Gwangil Du, Incheon (KR); Hoon Han, Gyeonggi-do (KR); Kwonchae Chung, Seoul (KR); Jae Young Choi, Seoul (KR); Hyukjin Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 215 days.

(21) Appl. No.: 17/037,182

(22) Filed: Sep. 29, 2020

(65) Prior Publication Data

US 2021/0281101 A1    Sep. 9, 2021

(30) Foreign Application Priority Data

Mar. 6, 2020   (KR) .................. 10-2020-0028246

(51) Int. Cl.
*H02J 7/14*       (2006.01)
*B60W 20/13*  (2016.01)
*H02J 7/00*       (2006.01)
*B60W 20/15*  (2016.01)

(52) U.S. Cl.
CPC .......... *H02J 7/1446* (2013.01); *B60W 20/13* (2016.01); *B60W 20/15* (2016.01); *H02J 7/0048* (2020.01)

(58) Field of Classification Search
CPC ... B60W 20/13; B60W 20/15; F02D 41/0042; F02D 41/06–065
USPC .................................................. 701/112–113
See application file for complete search history.

(56) References Cited

U.S. PATENT DOCUMENTS

| | | | | |
|---|---|---|---|---|
| 2005/0247495 | A1* | 11/2005 | Tabata | B60K 6/445 180/65.235 |
| 2013/0296098 | A1* | 11/2013 | Gibson | B60W 10/08 477/6 |
| 2013/0296101 | A1* | 11/2013 | Doering | B60W 10/023 180/65.265 |
| 2016/0152152 | A1* | 6/2016 | Gaither | B60L 50/15 701/22 |
| 2016/0215479 | A1* | 7/2016 | Ishihara | E02F 9/2232 |

(Continued)

FOREIGN PATENT DOCUMENTS

| | | | | |
|---|---|---|---|---|
| DE | 102007000331 | A1 * | 2/2008 | .......... B60K 17/356 |
| EP | 4011688 | A1 * | 6/2022 | ............. B60L 58/13 |
| JP | 2004312961 | A * | 11/2004 | |

(Continued)

*Primary Examiner* — Hung Q Nguyen
*Assistant Examiner* — Susan E Scharpf
(74) *Attorney, Agent, or Firm* — Fox Rothschild LLP

(57) ABSTRACT

A hybrid vehicle is provided and includes an input that receives user selection for terrain mode and a HSG connected to the engine to operate as a start motor to turn on the engine. The HSG operates as a generator that performs idle charging when the engine is turned on. A battery is electrically connected to the HSG. A controller configured perform idle charging when SOC of the battery is less than or equal to a first SOC through the HSG by turning on the engine.

18 Claims, 7 Drawing Sheets

(56) References Cited

U.S. PATENT DOCUMENTS

2019/0184971 A1* 6/2019 Kim .................. H02K 7/006

FOREIGN PATENT DOCUMENTS

| JP | 1108258 | B2 | 6/2008 | | |
|---|---|---|---|---|---|
| JP | 4108258 | B2 | 6/2008 | | |
| JP | 5661500 | B2 | 1/2015 | | |
| KR | 2019-0048254 | A | 5/2019 | | |
| WO | WO-2021036750 | A1 * | 3/2021 | .............. | B60L 58/13 |

* cited by examiner

HYBRID VEHICLE AND CONTROL METHOD THEREOF

CROSS-REFERENCE TO RELATED APPLICATION(S)

The present application claims priority to Korean Patent Application No 10-2020-0028246, filed on Mar. 6, 2020, the entire contents of which is incorporated herein for all purposes by this reference.

BACKGROUND

Field of the Disclosure

The present disclosure relates to a hybrid vehicle and a control method thereof, and more particularly, to a hybrid vehicle and a control method in which managing a state of charge (SOC) of battery in a terrain mode.

Description of Related Art

Recently, consumers have shown high preference for sport utility vehicles (SUVs) considering various utilization aspects. As one of the main functions of the SUV, the Terrain Mode enables proper driving by properly distributing driving power in off-road driving such as sand, mud, and snow. On the other hand, when the SUV is implemented in a hybrid manner, unlike a gasoline vehicle or a diesel vehicle, the performance of the battery is affected according to a state of charge. Therefore, when the hybrid vehicle is driving in the terrain mode, it is necessary to handle the SOC of the battery differently from the general road.

SUMMARY

One aspect of the disclosed disclosure provides a hybrid vehicle capable of optimizing the SOC of a battery in a terrain mode and a control method thereof. In accordance with an aspect of the present disclosure, a hybrid vehicle using an engine and a motor as a power source may include an input configured to receive user selection for terrain mode; a hybrid starter generator (HSG) connected to the engine to operate as a start motor to turn on the engine, and configured to operate as a generator that performs idle charging when the engine is turned on; a battery electrically connected to the HSG; and a controller configured to perform idle charging when SOC of the battery is less than or equal to a first SOC through the HSG by turning on the engine, and the controller may be configured to control the SOC of the battery to perform the idle charging based on a second SOC greater than the first SOC when the controller enters the terrain mode.

The controller may be configured to adjust the SOC of the battery to maintain the second SOC when entering the terrain mode. The hybrid vehicle may further include an acceleration pedal detector configured to detect and deliver a displacement amount of the acceleration pedal to the controller, and the controller may be configured to enter an electric vehicle (EV) driving mode when the displacement amount is not detected, enter a hybrid electric vehicle (HEV) driving mode when the displacement amount is detected, and enter the HEV driving mode when entering the terrain mode even if the displacement amount is not detected. The controller may be configured to adjust the SOC of the battery to maintain the second SOC by performing the idle charging based on the second SOC in the HEV driving mode when entering the terrain mode. The hybrid vehicle may further include a speed detector configured to detect and deliver the speed to the controller; and the controller may be configured to enter the EV driving mode until the first vehicle speed is reached in the stop state of the hybrid vehicle, and enter the HEV driving mode from the stop state when entering the terrain mode.

The controller may be configured to adjust the SOC of the battery to maintain the second SOC by performing idle charging based on the second SOC in the HEV driving mode when entering the terrain mode. The controller may be configured to enter the EV driving mode until the first vehicle speed is reached in the stop state of the hybrid vehicle when the SOC of the battery is equal or greater than the second SOC in the terrain mode. The controller may be configured to adjust an operating point of the engine upward when entering the terrain mode.

The hybrid vehicle may further include a longitudinal acceleration detector configured to detect longitudinal acceleration sensing value to calculate slope of a road and deliver to the controller and the controller may be configured to adjust size of the second SOC to be proportional to the slope in the terrain mode in response to determining that the slope of the road is an uphill slope. The hybrid vehicle may further include an acceleration pedal detector configured to detect displacement amount of an acceleration pedal and deliver to the controller and the controller may be configured to detect a decreased amount in the number of revolutions of the wheel when the displacement amount is not detected, determine road slope level based on the decreased amount, and adjust the size of the SOC of the battery to be proportional to the road slope level in the terrain mode, and the road slope level and the slope may be a proportional relationship.

In accordance with an aspect of the present disclosure, a controlling method of a hybrid vehicle using an engine and a motor as a power source may include receiving user selection for terrain mode; performing idle charging when the SOC of the battery is less than or equal to a first SOC through the HSG by turning on the engine; and adjusting the SOC of the battery to perform the idle charging based on a second SOC greater than the first SOC when entering the terrain mode. The performing of idle charging may include: adjusting the SOC of the battery to maintain the second SOC when entering the terrain mode.

The method may further include detecting and delivering a displacement amount of the acceleration pedal to the controller, and entering an EV driving mode when the displacement amount is not detected, entering a HEV driving mode when the displacement amount is detected, and entering the HEV driving mode when entering the terrain mode even if the displacement amount is not detected. The method may further include adjusting the SOC of the battery to maintain the second SOC by performing the idle charging based on the second SOC in the HEV driving mode when entering the terrain mode.

The method may further include detecting a vehicle speed and delivering the vehicle speed to the controller; and entering the EV driving mode until the first vehicle speed is reached in the stop state of the hybrid vehicle, and entering the HEV driving mode from the stop state when entering the terrain mode. The method may further include adjusting the SOC of the battery to maintain the second SOC by performing idle charging based on the second SOC in the HEV driving mode when entering the terrain mode.

The method may further include entering the EV driving mode until the first vehicle speed is reached in the stop state of the hybrid vehicle when the SOC of the battery is equal or greater than the second SOC in the terrain mode. Additionally, the method may include adjusting an operating point of the engine is upward when entering the terrain mode, detecting longitudinal acceleration sensing value to calculate slope of a road and deliver the detected longitudinal acceleration sensing value to the controller, and adjusting size of the second SOC to be proportional to the slope in the terrain mode in response to determining that the slope of the road is an uphill slope.

Further, the method may include detecting displacement amount of an acceleration pedal and deliver the detected displacement amount to the controller; and detecting a decreased amount in the number of revolutions of the wheel when the displacement amount is not detected, determining road slope level based on the decreased amount, and adjusting the size of the SOC of the battery to be proportional to the road slope level in the terrain mode. The road slope level and the slope is a proportional relationship.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Figure 1:
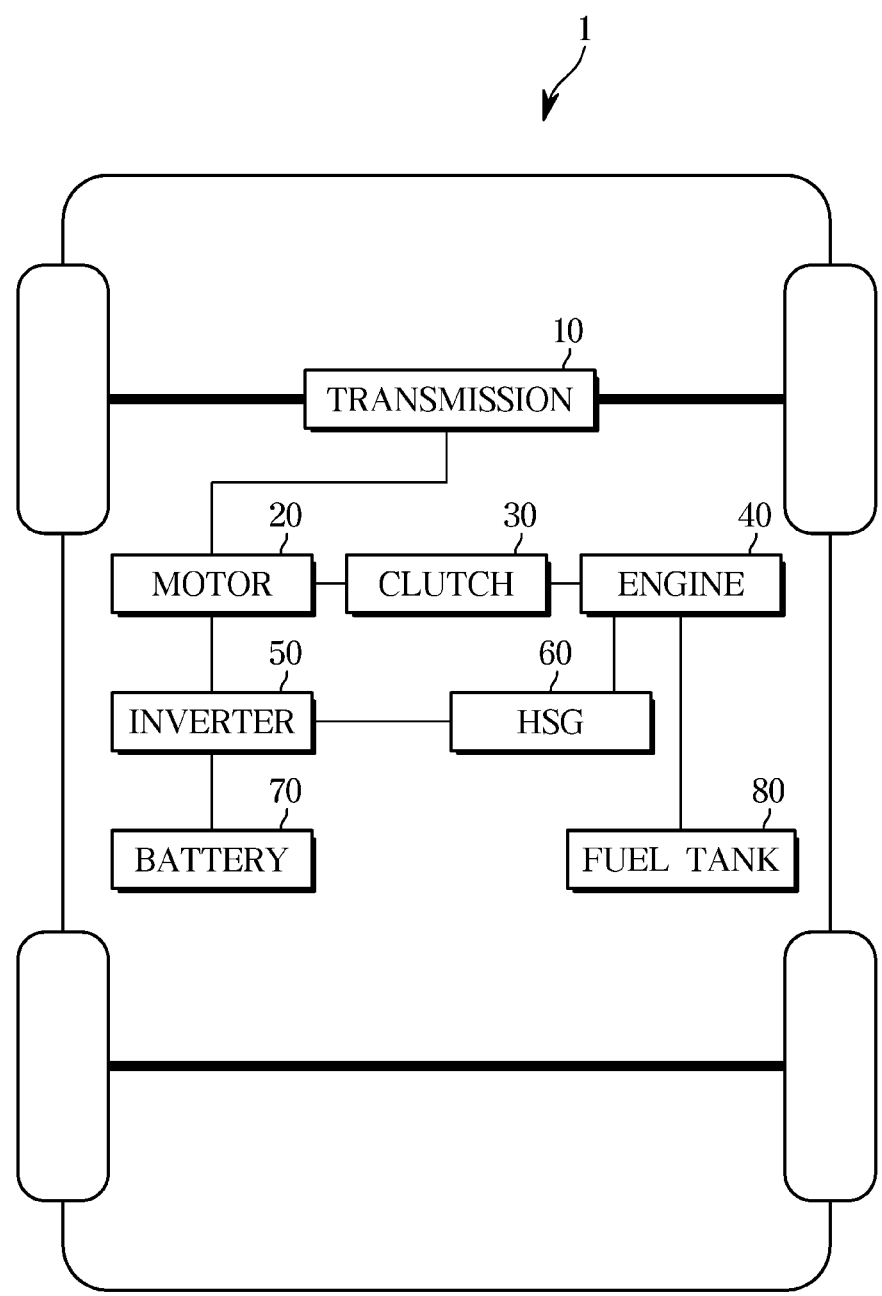
FIG. 1 is a configuration diagram of a vehicle according to an exemplary embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to various exemplary embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

In the following description, like reference numerals refer to like elements throughout the specification. This specification does not describe all elements of the embodiments, and in the Field of the Invention to which an exemplary embodiment of the present disclosure pertains, there is no overlap between the general contents or the embodiments. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

It will be understood that when an element is referred to as being "connected" another element, it may be directly or indirectly connected to the other element, wherein the indirect connection includes "connection via a wireless communication network". The terms first, second, etc. are used to distinguish one component from another component, and the component is not limited by the terms described above. An expression used in the singular encompasses the expression of the plural, unless it has a clearly different meaning in the context. The reference numerals used in operations are used for descriptive convenience and are not intended to describe the order of operations and the operations may be performed in a different order unless otherwise stated.

Figure 2:
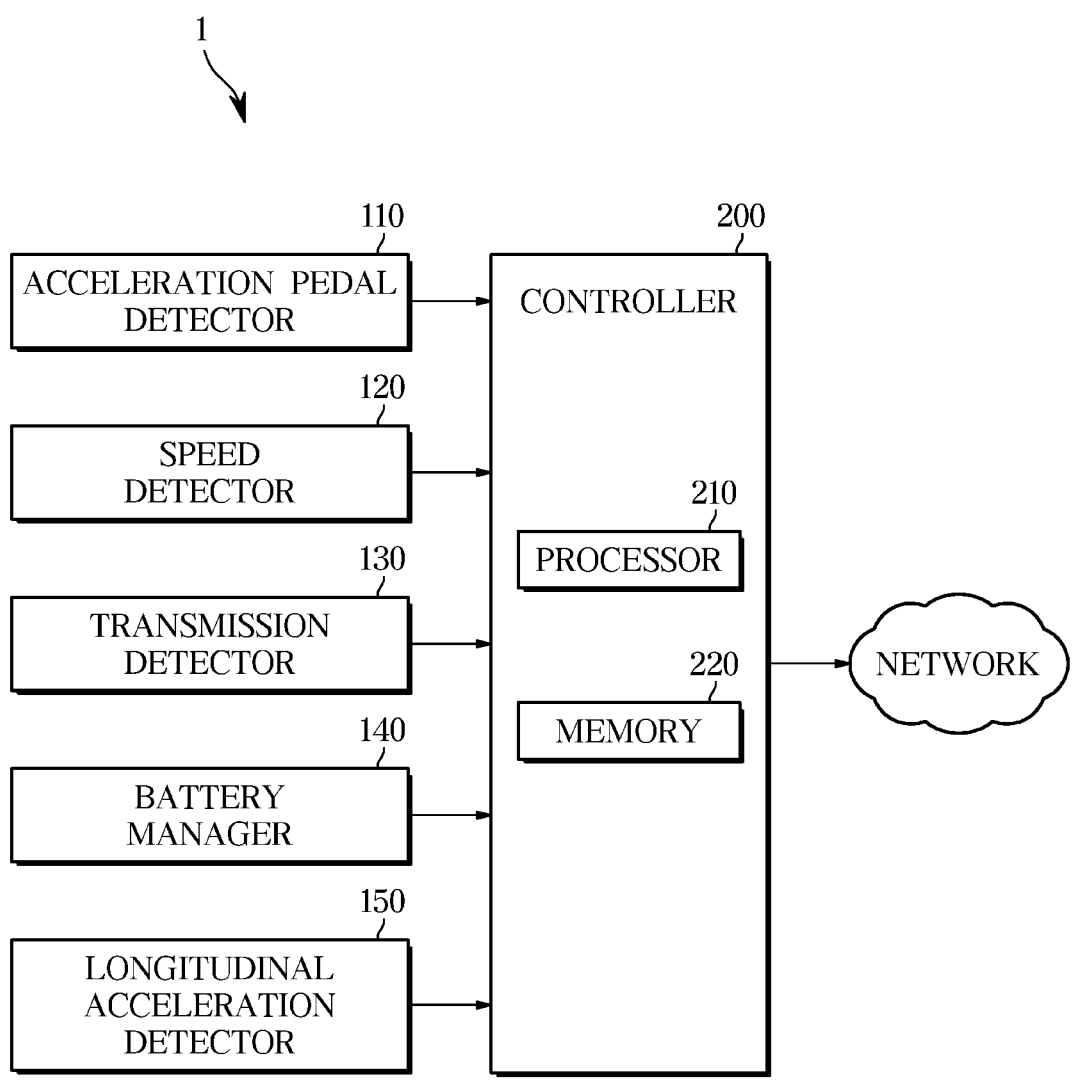
FIG. 2 is a control block diagram of a vehicle according to an exemplary embodiment.

Hereinafter, exemplary embodiments of the present disclosure will be described with reference to the accompanying drawings. FIG. 1 is a configuration diagram of a vehicle according to an exemplary embodiment. FIG. 2 is a control block diagram of a vehicle according to an exemplary embodiment. The hybrid vehicle 1 according to an exemplary embodiment may include a transmission 10, a motor 20, a clutch 30, an engine 40, an inverter 50, a hybrid starter and generator (HSG) 60, a battery 70 and a fuel tank 80.

The clutch 30 may be mounted between the motor 20 and the engine 40, and a transmission 10 may be connected to the output terminal of the motor 20. Accordingly, a hybrid vehicle 1 according to an exemplary embodiment may be applied with a transmission mounted electric device (TMED) method in which the output end of the motor 20 is directly connected to the transmission 10. The inverter 50 may be configured to convert and supply direct current (DC) stored in the battery 70 to alternating current (AC) to operate the motor 20. In addition, the inverter 50 may be configured to convert AC into DC to store energy in the battery 70.

When the SOC of the battery is decreased to less than a predetermined standard, the HSG 60 may be configured to start the engine 40 and operate the battery 70 to charge using the engine torque. In addition, when the SOC of the battery exceeds a certain level, the HSG 60 may be configured to begin the engine off and terminate charging. At this time, idle charging is a method of charging the battery 70 using an engine to maintain SOC balance when the battery charging state is decreased to less than a certain level during driving or stopping.

The HSG 60 may be connected to the engine 40 and operate as a start motor to turn on the engine 40, and when the engine 40 is turned on, may operate as a generator that performs idle charging. The fuel tank 80 may store liquid fuel, such as gasoline or diesel, and provide chemical energy to drive the engine 40. The controller 200 may be configured to adjust the output torque by integrally operating the components of the hybrid vehicle 1 connected to the network, and provide operation of the HEV mode and the EV mode by coupling or disengaging the clutch 30.

The controller 200 according to an exemplary embodiment may be configured execute on/off of the engine 40 according to the displacement amount of the acceleration pedal, the driving speed, the position of the shift stage, and the SOC of the battery 70. The controller 200 may be configured to detect whether the hybrid vehicle 1 is in a stopped state while driving according to the displacement amount of the accelerator pedal, the vehicle speed, and the position of the shift stage when the vehicle is stopped while driving, perform idle charging using the HSG 60 according to the SOC of the battery 70, and stop idle charging according to the displacement amount of the acceleration pedal.

The acceleration pedal detector 110 may be configured to detect the amount of displacement of the accelerator pedal and transmit the displacement amount to the controller 200 via the network, and the vehicle speed detector 120 may be configured to detect the vehicle speed and transmit the speed to the controller 200 via the network. The transmission detector 130 may be configured to detect the position of the current transmission stage of the transmission 10 and transmit the position to the controller 200 via a network. The battery manager 140 may be configured to comprehensively detect information such as voltage, current, and temperature of the battery 70 to manage the SOC, and transmit the SOC of the battery 70 to the controller 200 via a network.

Additionally, the longitudinal acceleration detector 150 may be configured to detect the longitudinal acceleration sensing value and transmit the value to the controller 200 via the network. At this time, the controller 200 may be configured to calculate the slope of the ground on which the vehicle is located based on the longitudinal acceleration sensing value. The battery manager 140 may be configured to execute the charging and discharging voltage of the battery 70 to prevent the battery 70 from being shortened due to over-discharging below the threshold voltage or overcharging above the threshold voltage. The battery 70 may include a plurality of unit cells, and a high voltage for providing driving power to the motor 20 is stored.

The controller 200 according to an exemplary embodiment may be configured to perform idle charging when the SOC of the battery 70 is less than or equal to the first SOC using the HSG 60 by turning on the engine 40. At this time, the first SOC indicates a criterion in which these charging starts when not in the terrain mode. For example, when the SOC has a value greater than the first SOC, the controller 200 may be configured to stop charging, and operate the HSG 60 so that the SOC of the battery 70 maintains the first SOC. At this time, when entering the terrain mode, the controller 200 may be configured to change the first SOC, which is the criterion for starting idle charging, to the second SOC.

The controller 200 may be configured to perform idle charging based on the second SOC greater than the first SOC. Accordingly, according to this exemplary embodiment, it may be possible to maintain a higher SOC state than in the terrain mode, and to provide driving force through the motor 20 having a high response speed in case of exiting the road. When entering the terrain mode, the controller 200 according to an exemplary embodiment may be configured to adjust the SOC of the battery 70 to maintain the second SOC. The controller 200 may include at least one memory 220 in which programs for performing the above-described operations and operations described below are stored, and at least one processor 210 for executing the stored programs. In the case of a plurality of memory and processors, it is possible that they are integrated in one chip, and it is also possible to be provided in a physically separate location.

Figure 3:
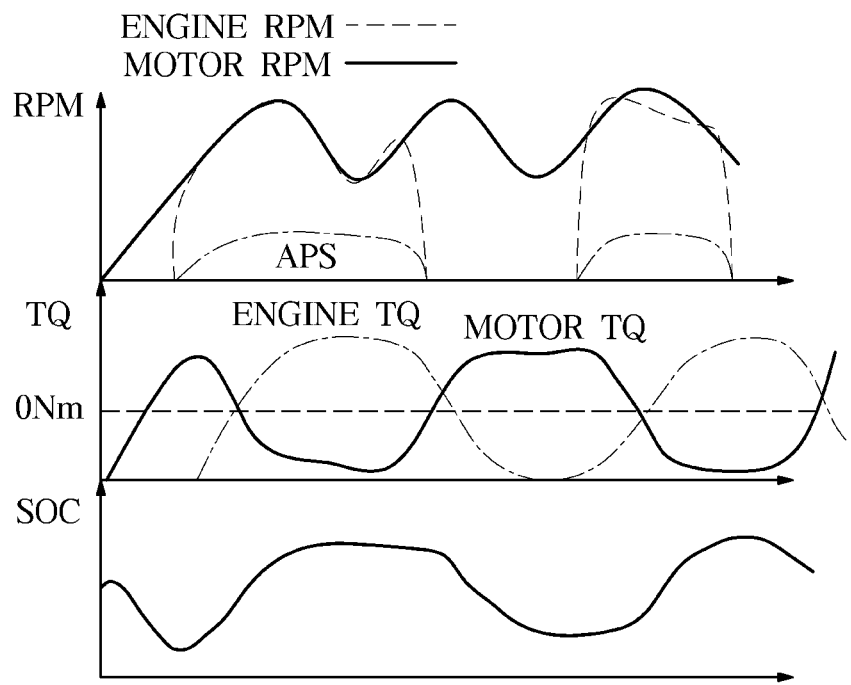
FIG. 3 is a diagram for explaining an example of a terrain mode according to an exemplary embodiment.
Figure 3:
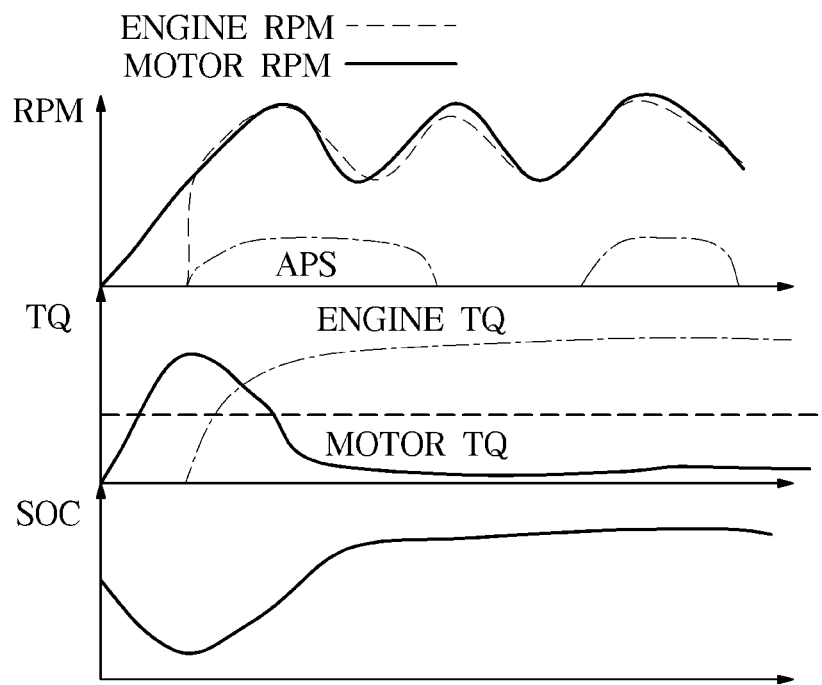

FIG. 3 is a diagram for explaining an example of a terrain mode according to an exemplary embodiment. As shown at the top of FIG. 3, TMED (Transmission Mounted Electric Device) system is the engine is driven, the motor driving amount increases until the engine clutch is engaged. In addition, since the engine driving does not occur when the displacement amount of the accelerator pedal is not detected, the driving force of the vehicle depends on the motor. At this time, the SOC of the battery may be decreased until the engine clutch is engaged, and thus, sufficient SOC is unable to be maintained.

In this exemplary embodiment, the engine clutch is always engaged with the engine at a predetermined vehicle speed or greater in the terrain mode, and thus, the engine driving force may always be utilized in the start/acceleration condition. The controller 200 according to an exemplary embodiment may be configured to receive the displacement amount of the accelerator pedal from the acceleration pedal detector 110, enter the EV driving mode when the displacement amount is not detected, and enter the HEV driving mode when the displacement amount is detected.

At this time, when entering the terrain mode, the controller 200 may be configured to maintain the binding between the clutch 30 and the engine 40 even if the displacement amount of the accelerator pedal is not detected, thereby entering the HEV driving mode. Therefore, the hybrid vehicle 1 according to the present embodiment may secure the SOC of a certain level or greater through idle charging by allowing the engine 40 to be driven even without input to the driver's accelerator pedal. The controller 200 according to an exemplary embodiment may be configured to maintain the SOC of the battery 70 as the second SOC by performing idle charging based on the second SOC in the HEV driving mode when entering the terrain mode. As shown in the lower part of FIG. 3, even if the displacement amount of the accelerator pedal is not detected, the engine driving force may be maintained, and thus, a SOC of a certain level or greater may be secured.

Figure 4:
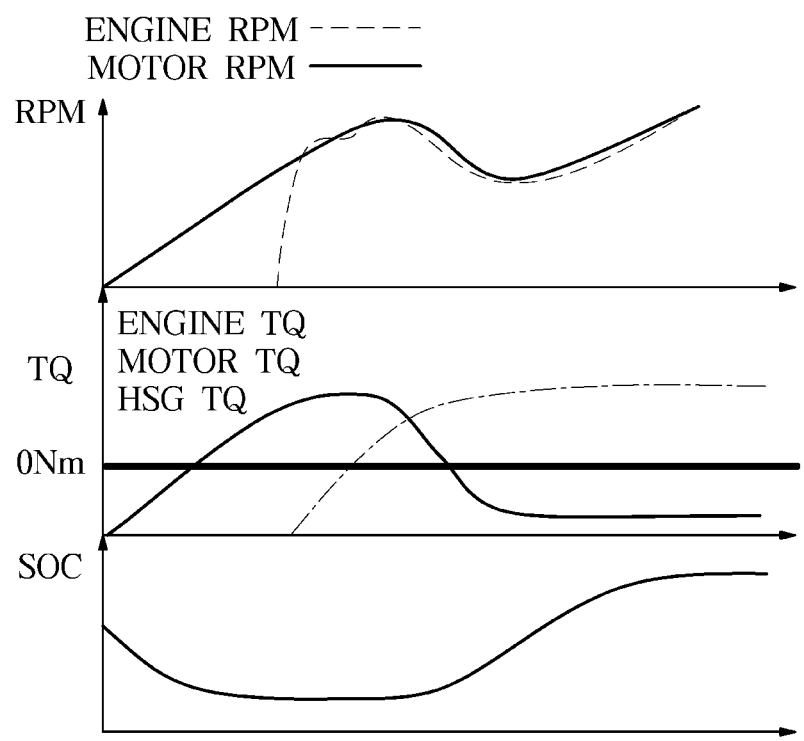
FIG. 4 is a diagram for explaining an example of a terrain mode according to another exemplary embodiment.
Figure 4:
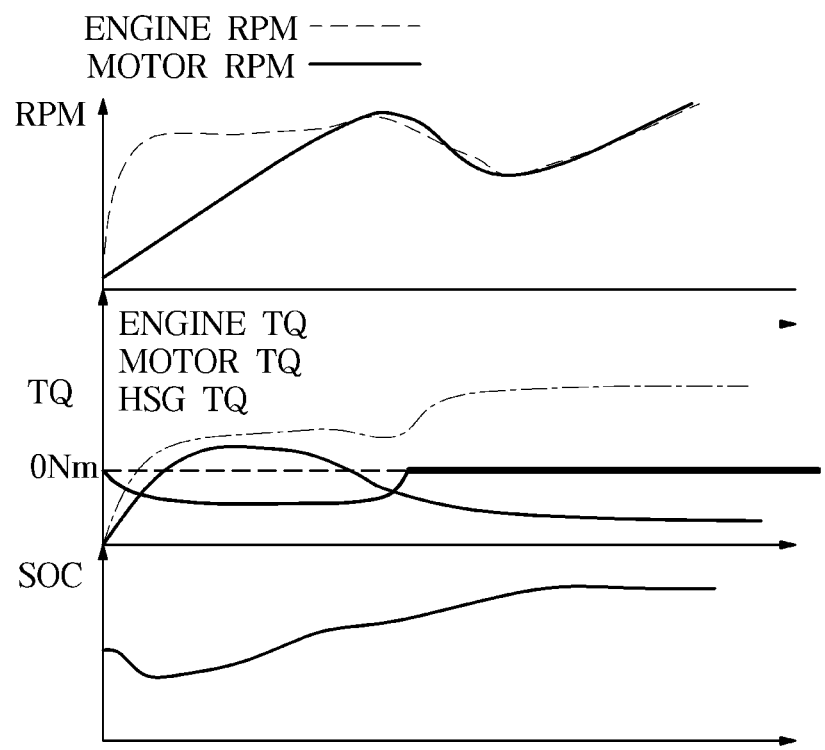

FIG. 4 is a diagram for explaining another example of a terrain mode according to another exemplary embodiment. The TMED system uses only the motor initially when the vehicle starts to start, it may include a sink control method using the power of the engine after the vehicle speed increases (see the upper part of FIG. 4) and a launch control method using the motor and the engine from the initial start (see the lower part of FIG. 4). In particular, the launch control method may be used when the power of the motor is insufficient when the SOC state of the battery does not satisfy a certain level (e.g., SOC low, low temperature or high temperature).

The controller 200 according to an exemplary embodiment may be configured to receive the vehicle speed from the speed detector 120, and operate the vehicle to enter the EV driving mode until the first vehicle speed is reached in the stopped state of the hybrid vehicle 1, and when entering the terrain mode, the controller 200 may be configured to operate the vehicle to enter the HEV driving mode from a stopped state. Therefore, the battery 70 may secure the SOC of a certain level or greater through the idle charging by driving the engine 40 from the moment the vehicle starts to start.

When entering the terrain mode, the controller 200 according to an exemplary embodiment may be configured to perform idle charging based on the second SOC in the HEV driving mode. At this time, the controller 200 may be configured to maintain the SOC of the battery 70 as the second SOC. However, to prevent the SOC of the battery 70 from being charged more than necessary, the controller 200 according to an exemplary embodiment, the controller may be configured to enter the EV driving mode instead of the HEV driving mode until the first vehicle speed is reached in the stopped state of the hybrid vehicle 1 when the SOC of the battery 70 is greater than or equal to the second SOC in the terrain mode.

Figure 5:
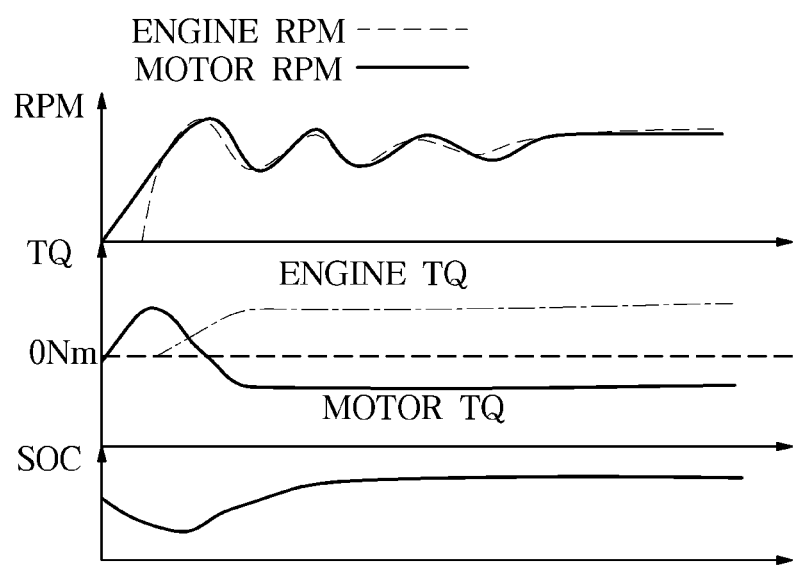
FIG. 5 is a diagram for explaining an engine operating point upward in a terrain mode according to an exemplary embodiment.
Figure 5:
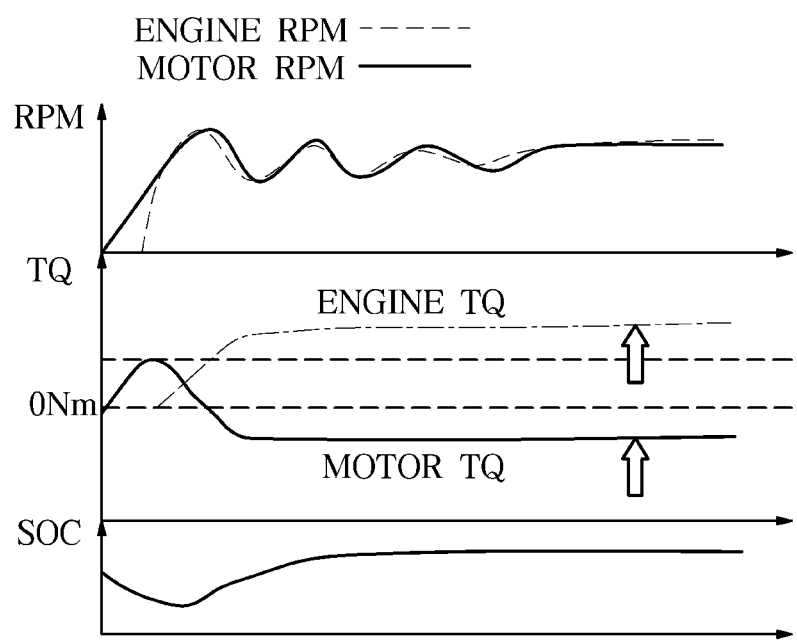

FIG. 5 is a diagram for explaining an engine operating point upward in a terrain mode according to an exemplary embodiment. In a hybrid vehicle, the engine may be driven at an optimal driving point in which the efficiency of the engine is maximized in a general driving situation due to a focus on fuel efficiency. On the other hand, in the case of a rough road driving in which a terrain mode is implemented, not in general driving, escape performance is more important than fuel efficiency. In particular, it is necessary to sufficiently secure the SOC by raising the operating region of the engine.

When entering the terrain mode, the controller 200 according to an exemplary embodiment may be configured to adjust the operating point of the engine 40 upward. At this time, the driving force of the motor 20 may be reduced as the driving point of the engine 40 is increased. Therefore, the battery 70 may secure a SOC higher than the existing level as the driving force of the engine 40 increases.

Figure 6:
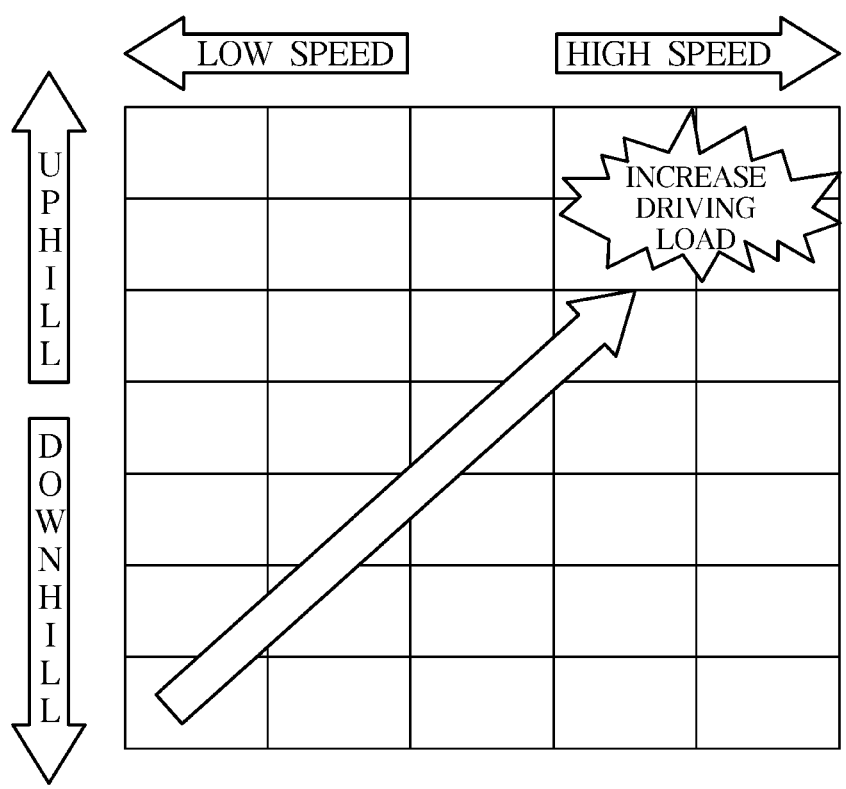
FIG. 6 is a diagram for explaining a process of determining a road slope level in a terrain mode according to an exemplary embodiment.

FIG. 6 is a diagram for explaining a process of determining a road slope level in a terrain mode according to an exemplary embodiment. Vehicles in which the terrain mode is implemented are subjected to loads according to the condition of the road. At this time, the state of the road includes the slope or road state (e.g., sand, mud and snowy road) of the road on which the vehicle is located, and the vehicle performs various controls based on the road slope level indicating the state of the road. At this time, the consumption of SOC of the battery increases with load due to road conditions.

Meanwhile, when the vehicle is driving on an inclined road, the longitudinal acceleration sensing value may be detected using the longitudinal acceleration sensor mounted on the vehicle, and the slope may be calculated by applying the longitudinal acceleration sensing value to the slope function. At this time, the vehicle may estimate the additional load received according to the degree of slope, and the individual control level may be determined in the terrain mode in consideration of the load received by the vehicle.

However, it is difficult to estimate the additional load when the vehicle is driving on sand, mud, or snow, unlike a sloping road. Thus, the road slope level due to the road surface condition may be determined by referring to the estimated load on the sloped road. The controller 200 according to an exemplary embodiment may be configured to receive the longitudinal acceleration sensing value from the longitudinal acceleration detector 150 and calculate the slope of the ground. At this time, in response to determining that the slope of the ground is a back slope, the controller 200 may be configured to adjust the second SOC size to be proportional to the slope in the terrain mode. As shown in FIG. 6, the load received by the vehicle may be proportional to the slope.

At this time, the load received by the vehicle causes a decrease in the number of revolutions of the wheel. Even when the vehicle is off-road, the load is generated and the number of revolutions of the wheel is reduced as if it is on a sloping ground. FIG. 6 shows a relationship between the load due to the slope and the load due to the number of revolutions of the vehicle. In the off-road, as the number of revolutions of the vehicle increases, the number of revolutions of the wheels decreases, and the load received by the vehicle increases.

The controller 200 according to an exemplary embodiment may be configured to receive the displacement amount of the accelerator pedal from the acceleration pedal detector 110 and detect a decrease in the number of revolutions of the vehicle and the number of revolutions of the wheel. At this time, the controller 200 may be configured to detect a decrease in the number of revolutions of the wheel when the displacement is not detected, and determine the road slope level based on the decrease. In the terrain mode, the controller 200 may be configured to adjust the size of the second SOC to be proportional to the road slope level. At this time, the slope of the road slope level is a proportional relationship, and the proportional relationship shown in FIG. 6 may be referred to.

Figure 7:
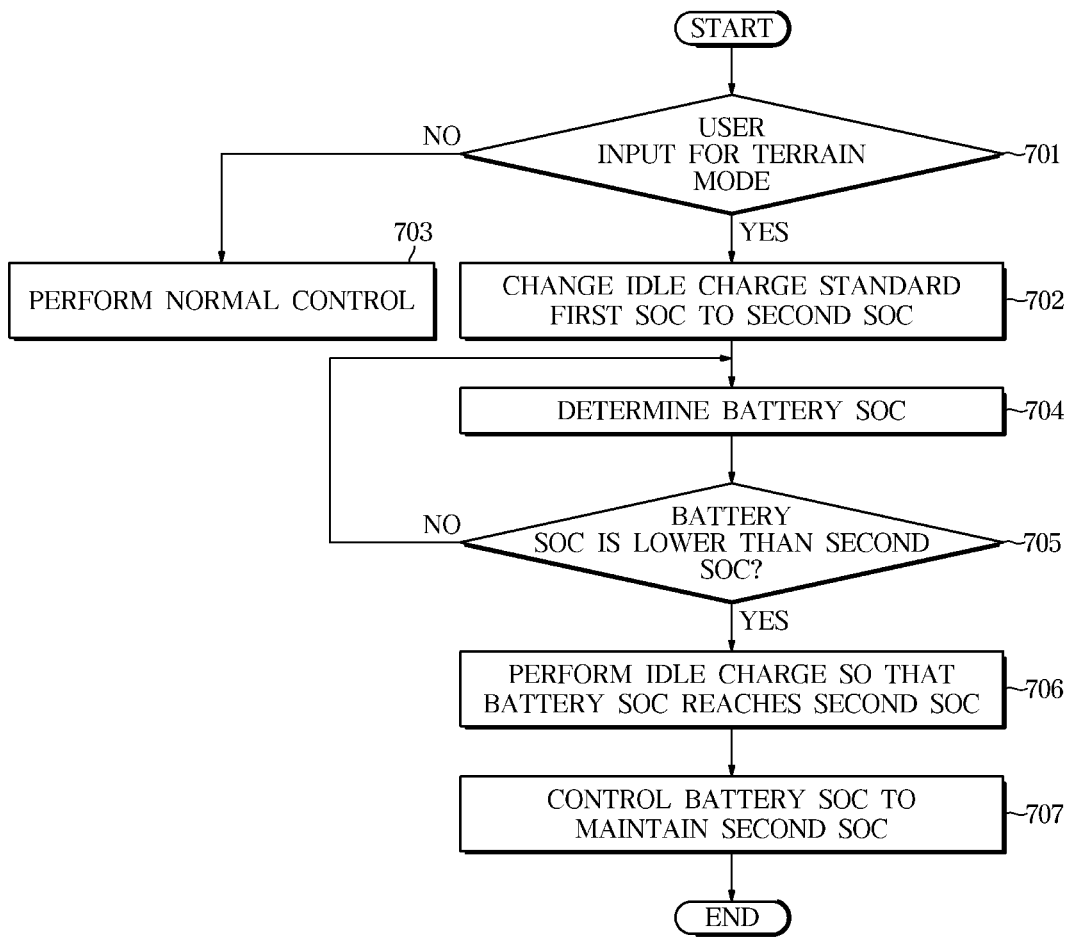
FIG. 7 is a flowchart of a control method according to an exemplary embodiment.

FIG. 7 is a flowchart of a control method according to an exemplary embodiment. The controller 200 may be configured to receive a user input for the terrain mode (701). Specifically, the driver may select a driving mode according to the terrain through an input to the terrain mode switch. At this time, the controller 200 may be configured to perform various controls according to the driving mode input by the user. If the controller 200 does not detect a user input to the terrain mode, the controller may be configured to perform general control (703).

When the user input for the terrain mode is detected, the controller 200 may be configured to change the first SOC, which is the criterion of idle charging, to the second SOC to secure a higher level of electrical energy than the SOC of the existing battery (702). At this time, the second SOC indicates a higher energy storage amount than in the case of not in the terrain mode, and may be in various capacities according to the initial production stage of the manufacturer and the user's setting. The controller 200 may be configured to determine the SOC of the battery (704). If the SOC of the battery is equal to or less than the second SOC (705), idle charging may be performed for the SOC of the battery to reach the second SOC (706). The SOC of the battery may be adjusted to maintain the second SOC (707).

As described above, the disclosed exemplary embodiments have been described with reference to the accompanying drawings. Those skilled in the art will understand that the present disclosure may be implemented in a form different from the disclosed exemplary embodiments without changing the technical spirit or essential features of the present disclosure. The disclosed exemplary embodiments are exemplary and should not be construed as limiting.

On the other hand, the disclosed exemplary embodiments may be implemented in a form of a recording medium for storing instructions executable by a computer. Instructions may be stored in a form of program code and, when executed by a processor, may generate a program module to perform the operations of the disclosed exemplary embodiments. The recording medium may be implemented as a computer-readable recording medium.

The computer-readable recording medium includes all types of recording media in which instructions which may be decoded by a computer. For example, there may be read only memory (ROM), random access memory (RAM), a magnetic tape, a magnetic disk, a flash memory, an optical data storage device, and the like.

As described above, the disclosed exemplary embodiments have been described with reference to the accompanying drawings. Although example embodiments of the present disclosure have been shown and described, it would be appreciated by those skilled in the art that changes may be made to these embodiments without departing from the principles and spirit of the present disclosure, the scope of which is defined in the claims and their equivalents.

According to one aspect of the disclosed disclosure, a sufficient SOC level of the battery is secured in the terrain mode, so that the driving force of the motor can be maximized in off-road.

What is claimed is:

1. A hybrid vehicle using an engine and a motor as a power source, comprising:
   an input configured to receive user selection for terrain mode;
   a hybrid starter generator (HSG) connected to the engine and configured to operate as a start motor to turn on the engine, and operate as a generator that performs idle charging when the engine is turned on;
   a battery electrically connected to the HSG;
   a controller configured to perform idle charging when a state of charge (SOC) of the battery is less than or equal to a first SOC using the HSG by turning on the engine; and
   a vehicle speed detector configured to detect and deliver a vehicle speed to the controller,
   wherein the controller is configured to adjust the SOC of the battery to perform the idle charging based on a second SOC greater than the first SOC when the controller enters the terrain mode; and
   wherein the controller is configured to enter an EV driving mode by driving the motor until a first vehicle speed is reached in a stop state of the hybrid vehicle, and enter an HEV driving mode from the stop state when entering the terrain mode.

2. The hybrid vehicle according to claim 1, wherein the controller is configured to adjust the SOC of the battery to maintain the second SOC when entering the terrain mode.

3. The hybrid vehicle according to claim 1 further comprising:
   an acceleration pedal detector configured to detect and deliver a displacement amount of the acceleration pedal to the controller,
   wherein the controller is configured to enter an EV driving mode when the displacement amount is not detected, enter a HEV driving mode when the displacement amount is detected, and enter the HEV driving mode when entering the terrain mode even if the displacement amount is not detected.

4. The hybrid vehicle according to claim 3, wherein the controller is configured to adjust the SOC of the battery to maintain the second SOC by performing the idle charging based on the second SOC in the HEV driving mode when entering the terrain mode.

5. The hybrid vehicle according to claim 1, wherein the controller is configured to adjust the SOC of the battery to maintain the second SOC by performing idle charging based on the second SOC in the HEV driving mode when entering the terrain mode.

6. The hybrid vehicle according to claim 5, wherein the controller is configured to enter the EV driving mode until the first vehicle speed is reached in the stop state of the hybrid vehicle when the SOC of the battery is equal or greater than the second SOC in the terrain mode.

7. The hybrid vehicle according to claim 1, wherein the controller is configured to adjust an operating point of the engine upward when entering the terrain mode.

8. The hybrid vehicle according to claim 1 further comprising:
   a longitudinal acceleration detector configured to detect longitudinal acceleration sensing value to calculate slope of a road and deliver to the controller,
   wherein the controller is configured to adjust size of the second SOC to be proportional to the slope in the terrain mode in response to determining that the slope of the road is an uphill slope.

9. The hybrid vehicle according to claim 8 further comprising:
   an acceleration pedal detector configured to detect displacement amount of an acceleration pedal and deliver to the controller;
   wherein the controller is configured to detect a decreased amount in the number of revolutions of the wheel when the displacement amount is not detected, determine road slope level based on the decreased amount, and adjust the size of the SOC of the battery to be proportional to the road slope level in the terrain mode, and
   wherein the road slope level and the slope is a proportional relationship.

10. A controlling method of a hybrid vehicle using an engine and a motor as a power source, the method comprising:

receiving, by a controller, user selection for terrain mode;

performing, by the controller, idle charging when a state of charge (SOC) of the battery is less than or equal to a first SOC through a hybrid starter generator (HSG) by turning on the engine;

adjusting, by the controller, the SOC of the battery to perform the idle charging based on a second SOC greater than the first SOC when entering the terrain mode;

detecting a vehicle speed and delivering the vehicle speed to the controller; and entering an EV driving mode by driving the motor until a first vehicle speed is reached in a stop state of the hybrid vehicle, and entering a HEV driving mode from the stop state when entering the terrain mode.

11. The method according to claim 10, wherein performing idle charging includes: adjusting the SOC of the battery to maintain the second SOC when entering the terrain mode.

12. The method according to claim 10 further comprising:
detecting and delivering a displacement amount of the acceleration pedal to the controller, and entering an electric vehicle (EV) driving mode when the displacement amount is not detected, entering a hybrid electric vehicle (HEV) driving mode when the displacement amount is detected, and entering the HEV driving mode when entering the terrain mode even if the displacement amount is not detected.

13. The method according to claim 12 further comprising: adjusting the SOC of the battery to maintain the second SOC by performing the idle charging based on the second SOC in the HEV driving mode when entering the terrain mode.

14. The method according to claim 10 further comprising:
adjusting the SOC of the battery to maintain the second SOC by performing idle charging based on the second SOC in the HEV driving mode when entering the terrain mode.

15. The method according to claim 14 further comprising:
entering the EV driving mode until the first vehicle speed is reached in the stop state of the hybrid vehicle when the SOC of the battery is equal or more than the second SOC in the terrain mode.

16. The method according to claim 10 further comprising:
adjusting an operating point of the engine is adjusted upward when entering the terrain mode.

17. The method according to claim 10 further comprising:
detecting longitudinal acceleration sensing value to calculate slope of a road and deliver the detected longitudinal acceleration sensing value to the controller, and adjusting size of the second SOC to be proportional to the slope in the terrain mode in response to determining that the slope of the road is an uphill slope.

18. The method according to claim 17 further comprising:
detecting displacement amount of an acceleration pedal and delivering the detected displacement amount to the controller; and detecting a decreased amount in the number of revolutions of the wheel when the displacement amount is not detected, determining road slope level based on the decreased amount, and adjusting the size of the SOC of the battery to be proportional to the road slope level in the terrain mode, wherein the road slope level and the slope is a proportional relationship.

* * * * *